United States Patent [19]

Mann

[11] 4,270,936
[45] Jun. 2, 1981

[54] COILED FIBROUS METALLIC MATERIAL AND COATING FOR DIESEL EXHAUST PARTICULATE TRAP

[75] Inventor: Gamdur S. Mann, Flint, Mich.

[73] Assignee: General Motors Corporation, Detroit, Mich.

[21] Appl. No.: 113,223

[22] Filed: Jan. 18, 1980

[51] Int. Cl.³ ............................................. B01D 46/10
[52] U.S. Cl. ........................................ 55/520; 55/524; 55/523; 55/DIG. 30; 55/466; 60/311; 252/475; 252/477 R
[58] Field of Search ................. 55/466, 520, 522, 523, 55/524–527, DIG. 30; 60/282, 299, 300, 301, 302, 303, 311; 422/177, 180, 211, 222; 252/463, 469, 475, 477

[56] References Cited

U.S. PATENT DOCUMENTS

| | | | |
|---|---|---|---|
| 2,065,871 | 12/1936 | Rehfus | 55/520 |
| 3,083,524 | 4/1963 | Dosie | 55/DIG. 30 |
| 3,495,950 | 2/1970 | Barber et al. | 60/299 |
| 3,815,337 | 6/1974 | Lenane | |
| 3,928,533 | 12/1975 | Beall et al. | 423/213.5 |
| 3,993,600 | 11/1976 | Hunter | 55/524 |
| 4,087,966 | 5/1978 | Akado et al. | |
| 4,122,015 | 10/1978 | Oda et al. | 55/526 |
| 4,211,075 | 7/1980 | Ludecke et al. | 60/311 |

FOREIGN PATENT DOCUMENTS

| | | | |
|---|---|---|---|
| 2756570 | 9/1978 | Fed. Rep. of Germany | 60/299 |
| 2750960 | 5/1979 | Fed. Rep. of Germany | 60/282 |
| 2849069 | 5/1979 | Fed. Rep. of Germany | 55/526 |
| 53-42848 | 11/1978 | Japan | 422/177 |
| 2000045 | 1/1979 | United Kingdom | 422/177 |

Primary Examiner—Bernard Nozick
Attorney, Agent, or Firm—Robert J. Outland

[57] ABSTRACT

A fibrous filter element for trapping diesel engine exhaust particulates comprises a mass of coiled wire of flattened cross section compacted into a small passage gas pervious body. The base wire is made of high temperature resistant metal, preferably an iron chromium aluminum alloy. The wire is coated with a particulate collection-enhancing coating of titanate ceramic.

4 Claims, 4 Drawing Figures

U.S. Patent Jun. 2, 1981 4,270,936
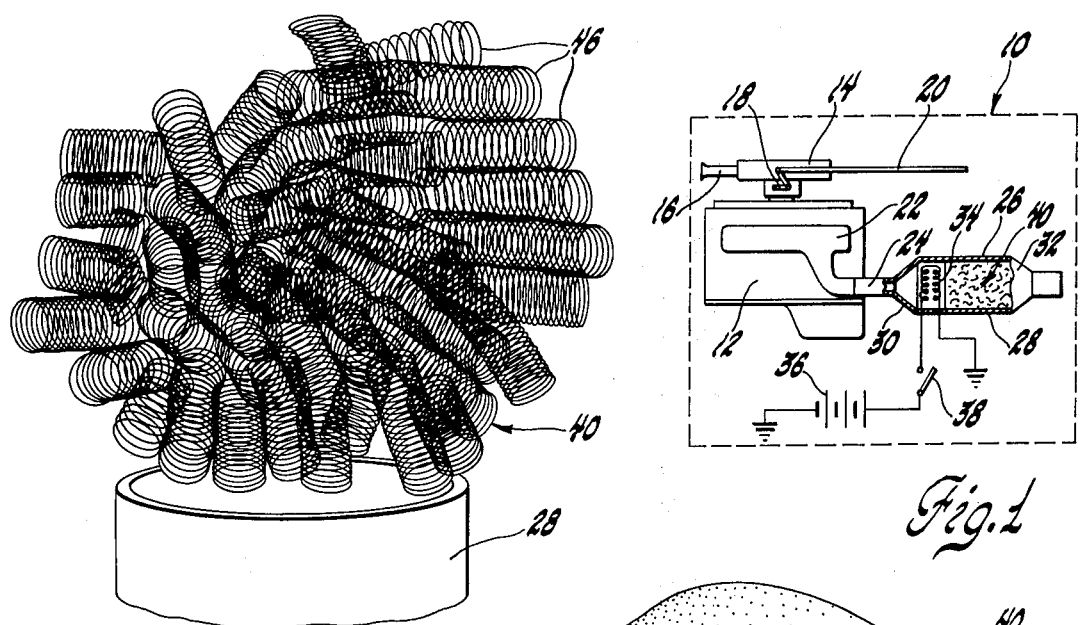
Fig. 1
Fig. 2
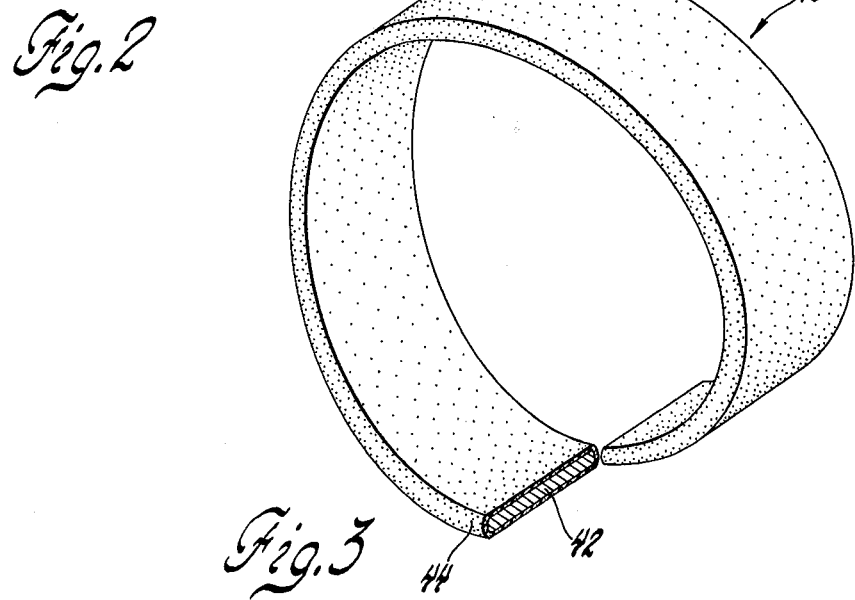
Fig. 3
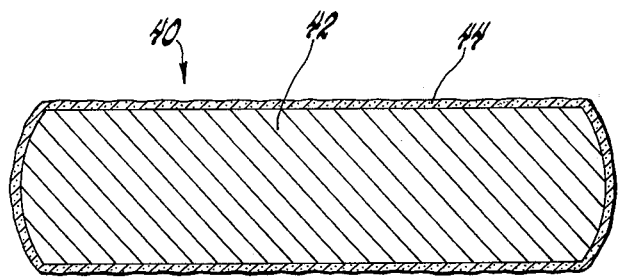
Fig. 4

COILED FIBROUS METALLIC MATERIAL AND COATING FOR DIESEL EXHAUST PARTICULATE TRAP

BACKGROUND

Currently, efforts are underway to identify and develop practical ways in which the exhaust particulates of automotive diesel engines may be limited to amounts that will permit extensive use of diesel engine powered vehicles without resulting in adverse environmental effects. Among the various methods being considered is the use of exhaust particulate traps for collecting and disposing of particulates in vehicle exhaust systems after they are emitted from their engines. It is therefore desired to provide filter materials which may be used in diesel exhaust traps for the collection of exhaust gas particulates and their subsequent disposal, preferably by incineration in the exhaust system without damage to the filter element.

SUMMARY

I have conceived of certain related forms of fibrous filter element materials which are calculated to provide for efficient filtration over extended periods without deterioration of the filter material and to permit periodic incineration of particulates collected in the trap at temperatures up to 1800 degrees F. without harm to the element.

The invention includes fibrous metallic wire preferably having an extended surface area which may be formed by flattening round wire to provide a tightly coiled body of wire with a flattened enlarged area cross section. The wire is made of a high temperature resistant material capable of withstanding temperatures of up to 1800 degrees F. without damage and is preferably formed of an iron chromium aluminum alloy optionally including traces of rare earth materials. The wire body is preferably treated to provide a protective oxide coating that limits corrosion and enhances its particulate collection and retention ability. A smooth and dense alpha alumina scale (aluminum oxide) which is free of porosity and cracks may be formed to accomplish this purpose. Preferably, the wire is coated with titania or other titanate ceramics to provide a desirable rough surface of high electrical resistivity and dielectric constant that should maximize the collection and retention ability of the compacted wire material.

These and other features and advantages of the invention will be more fully understood from the following description of a preferred embodiment taken together with the accompanying drawing.

BRIEF DESCRIPTION OF THE DRAWING

In the drawing;

FIG. 1 is a side view of a vehicle installed automotive diesel engine and its attached exhaust particulate control system including a particulate trap having filter material in accordance with the invention;

FIG. 2 is a pictorial view showing the filter material for installation in the open container of the particulate trap of FIG. 1;

FIG. 3 is a greatly enlarged pictorial view of one coil of the fibrous filter material of FIG. 2, and FIG. 4 is a further enlarged cross-sectional view of the flattened and coated wire filter material.

BEST MODE DESCRIPTION

Referring now to the drawing in detail, numeral 10 generally indicates an automotive vehicle having installed therein a diesel engine 12 having an air induction system including a filter housing 14. Air entering the induction system enters the filter housing through an inlet horn 16 containing a throttle 18 adjustable between open and closed positions by suitable mechanism 20. Engine 12 is also provided with an exhaust manifold 22 that receives exhaust gases from the engine cylinders and is connected by an exhaust pipe 24 with an exhaust particulate trap 26 that has the purpose of trapping and disposing of particulates emitted from the engine with the diesel exhaust gases.

The particulate trap 26 has an elongated generally cylindrical housing 28 with conically shaped inlet and outlet ends 30, 32 respectively. At the inlet end 30 of the housing there is provided an electric heating element 34 connectable electrically to a battery 36 by the closing of a switch 38 to energize the heating element 34 for purposes to be subsequently described. Within the housing, downstream of the heating element, there is a fibrous filter material 40 compacted to define a gas pervious body having small interconnected passages extending therethrough.

The fibrous filter material 40, best shown in FIGS. 2–4, is preferably made of a high temperature resistant metallic wire capable of withstanding temperatures of up to 1800 degrees F. without damage. One example of a base wire material suitable for the purpose is an iron chromium aluminum alloy containing a minimum of about 11.5 percent chromium and 4 percent aluminum with the remainder made up primarily of iron. The alloy may further include small amounts of from about 0.02 to 0.25 percent of one of the rare earth materials yttrium, lanthanum and hafnium.

The base wire material may be formed in conventional fashion as a round wire and then subsequently rolled or otherwise flattened to provide a body 42 of coiled high temperature wire of elongated cross-section and increased surface area (as best shown in FIG. 4). Alternatively, the wire may be formed with any other suitable cross-sectional extended area configuration to accomplish the desired purpose. The dimensions may be varied as appropriate; however, an exemplary size for the flattened wire is a width of 0.009 inches and a thickness of 0.0025 inches.

The rolling or flattening operation during manufacture of the wire preferably results in curling of the wire into small coils as shown in FIGS. 2 and 3. The tightly coiled wire is preferably pre-treated by heating in air to develop an aluminum oxide coating that is smooth and dense with freedom from porosity and cracks so as to provide protection against further oxidation of the base metal during subsequent use as a filter material.

It is recognized that an alpha alumina aluminum oxide scale forms a coating that improves the collection efficiency of metallic fiber materials used as particulate traps. It is thought that the reasons for this improvement include not only the roughened character of the wire surface resulting from the alumina coating but also from the relatively high dielectric constant of the alumina which permits the retention of surface electric charges that attract the charged carbon particulate matter in the diesel engine exhaust and permit it to be held in place after it contacts a fiber of the filter material.

With this in mind it is conjectured that further improved collection efficiency might be obtained by providing a wire coating of high temperature material having dielectric properties of greater magnitude than the alumina coating. These qualities are found in such materials as titanate ceramics and titanates, such as $BaTiO_3$, which provide high temperature resistance and have dielectric properties about 100 times higher than alumina at operating temperatures expected in a diesel exhaust filter. Accordingly, the preferred embodiment of the fibrous filter material 40 includes a coating of titanate ceramic material 44 over the flattened wire body 42 to provide the improved collection efficiency desired.

The tightly coiled wire is preferably provided as a continuous strand forming a random mass of coils 46 which is forced into the open end of the housing 28 to provide the compacted small passage defining gas pervious body of filter material 40 in the installed condition.

During operation of the vehicle 10 shown in FIG. 1, the engine 12 produces exhaust gases which are collected by the exhaust manifold 22 and delivered through pipe 24 to the particulate trap 26. Here the fibrous filter material 40 collects and retains a substantial percentage of the carbonaceous particulates present in the exhaust gases with the volume of particulates building up over a period of time to a predetermined level.

At this point the filter material may be cleaned or replaced as desired. However, it is considered preferable at present to remove the collected particulates by incineration during normal operation of the engine and vehicle. This may be accomplished, for example, by throttling the engine air intake through partial closing of the throttle 18 by manual or automatic means as desired, thus raising the temperature of the diesel exhaust gases to a level at which ignition and combustion of the collected particulates is initiated. The burn combustion is supported by excess oxygen in the diesel engine exhaust gases so that the combustion spreads and burns out a substantial portion of the collected particulates before combustion terminates.

If engine operating conditions are such that throttling of the intake does not provide a sufficient increase in exhaust temperature to ignite the particulates, the exhaust gases may be supplementally heated by closing the switch 38 and energizing the electric heating element 34 provided in the particulate trap 26. This heater supplements the temperature increase obtained by throttling to provide the necessary added temperature for ignition and combustion of the particulates. Following the burnoff of particulates, the throttle is opened and the heater, if used, is deenergized so that the system is returned to normal operation.

It should be apparent that any other means of igniting the exhaust particulates may be used in substitution for the throttling and electric heating methods disclosed herein which are exemplary only and not intended to form part of the present invention.

The structure and materials of the preferred embodiment of the invention described are exemplary only and should not be considered as limiting the scope of the inventive concepts disclosed. For example, it should be understood that the flattened wire structure may be made from any suitable high temperature material capable of use in the high temperatures of a diesel exhaust system. Further, the iron chromium aluminum alloy wire material may be formed in other than the flattened shape illustrated and still be usable as a filter material in a particulate trap of the type described herein. Additionally, the titanate and titanate ceramic coating materials referred to could be provided on base fiber materials of any suitable sort, not limited to the wire structure or materials described herein. Since the various forms of the invention obviously extend beyond the scope of the limited forms described, it is intended that the invention have the full scope permitted by the language of the following claims.

We claim:

The embodiments of the invention in which an exclusive property or privilege is claimed are defined as follows:

1. A fibrous filter element for a diesel engine exhaust particulate trap or the like, said element comprising a mass of coiled wire coils of flattened cross section compacted into a small passage gas pervious body, said wire being formed of a metallic material and coated with a titanate ceramic, said wire and coating being capable of withstanding temperatures of up to 1800 degrees F. without damage to the element.

2. The combination of claim 1 wherein said wire is formed of an iron based alloy containing a minimum of about 11.5 percent chromium and 4 percent aluminum.

3. The combination of claim 2 wherein said alloy further contains amounts of from 0.02 to 0.25 percent of an oxidation and sulfidation improving rare earth material.

4. The combination of claim 3 wherein said rare earth material is selected from the group consisting of yttrium, lanthanum and hafnium.

* * * * *

UNITED STATES PATENT AND TRADEMARK OFFICE
CERTIFICATE OF CORRECTION

PATENT NO. : 4,270,936
DATED : June 2, 1981
INVENTOR(S) : Gamdur S. Mann

It is certified that error appears in the above—identified patent and that said Letters Patent is hereby corrected as shown below:

Col. 2, line 64, "dielectrical" should read -- dielectric --.

Col. 4, line 29, delete "We claim:".

Claim 1, Col. 4, line 35, delete "coiled".

Signed and Sealed this

Twenty-second Day of September 1981

[SEAL]

*Attest:*

*Attesting Officer*

GERALD J. MOSSINGHOFF

*Commissioner of Patents and Trademarks*